Aug. 12, 1930.  H. PARKER  1,772,679
JOURNAL BOX BEARING
Filed March 2, 1927     4 Sheets-Sheet 1
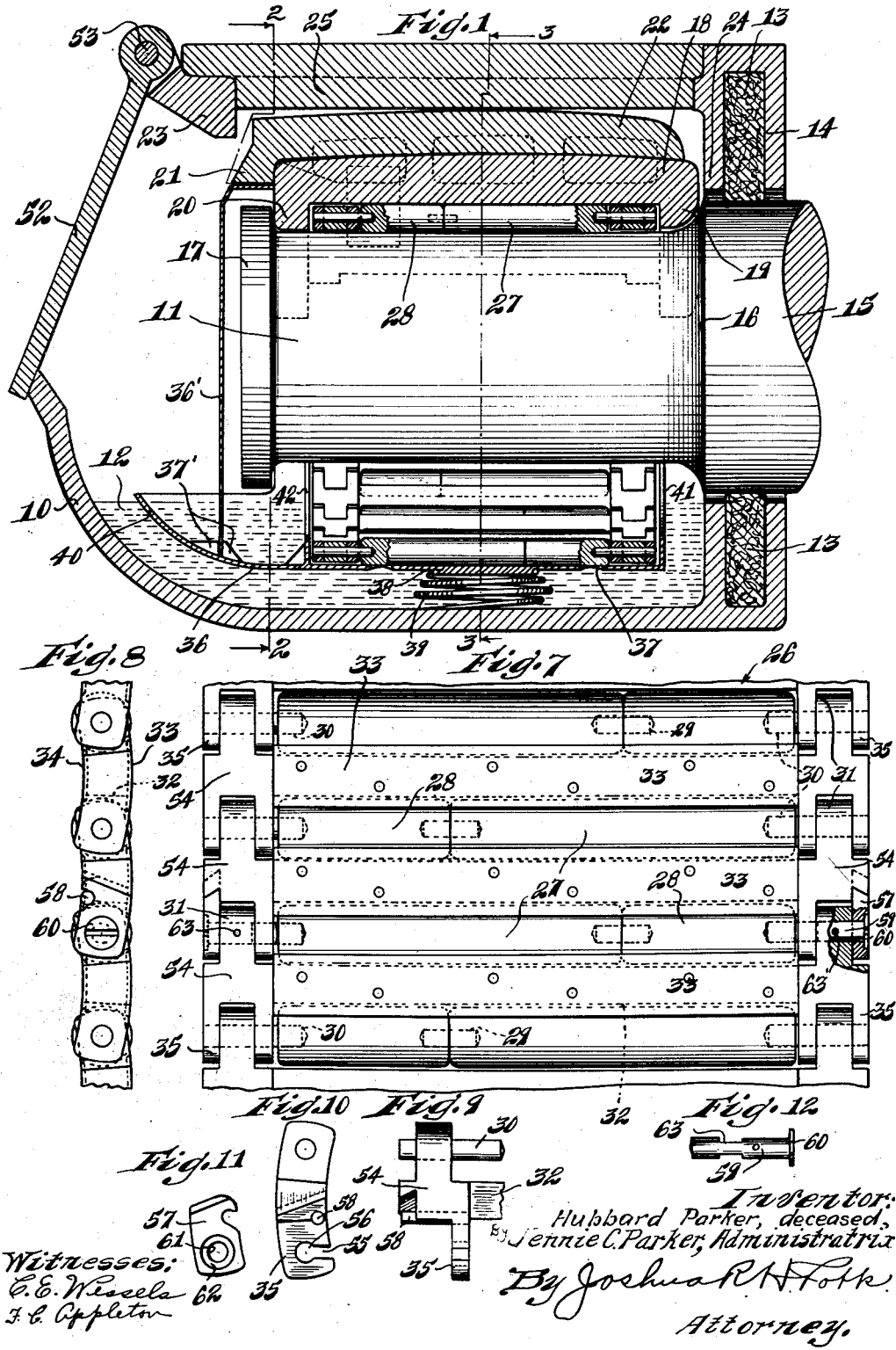

Aug. 12, 1930.                H. PARKER                1,772,679
                           JOURNAL BOX BEARING
                        Filed March 2, 1927      4 Sheets-Sheet 2
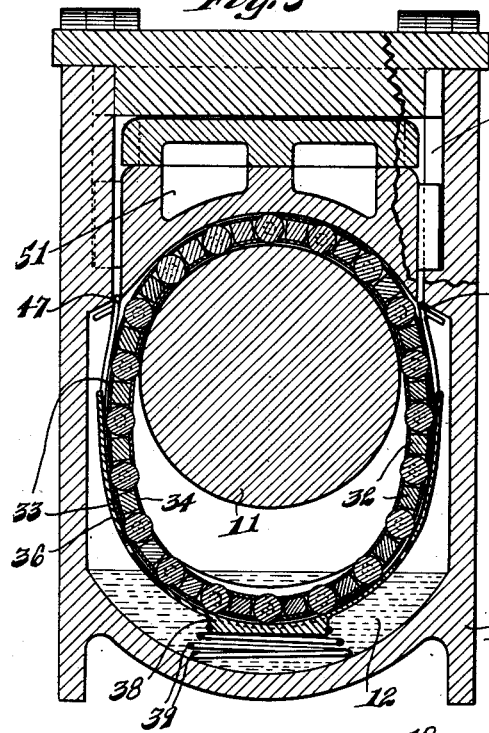
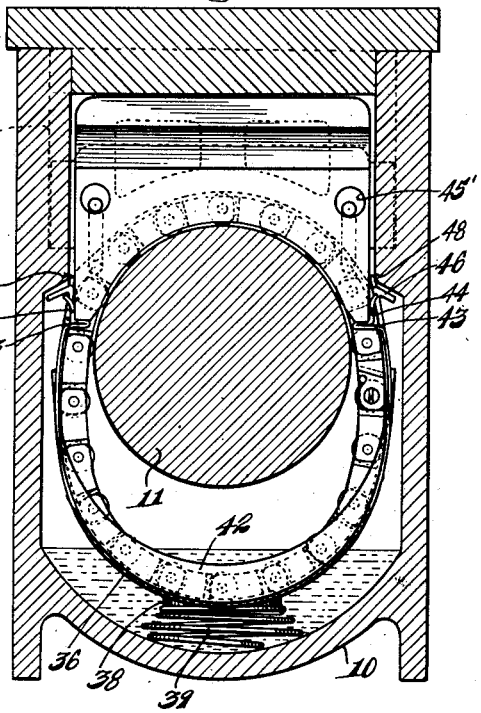
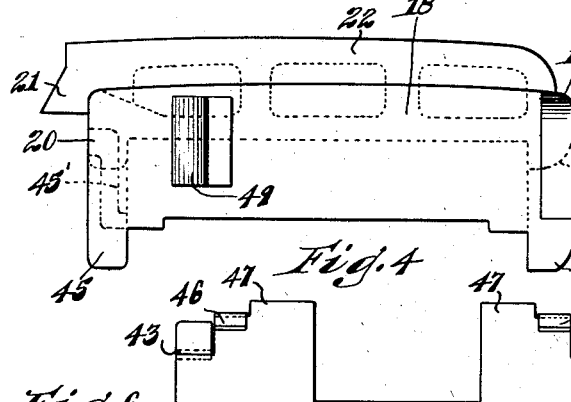
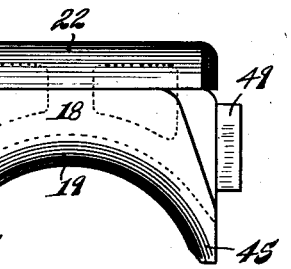
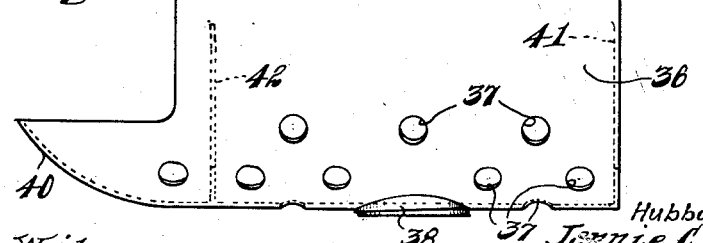
Witnesses:
E. E. Wessels
F. C. Appleton
Inventor:
Hubbard Parker, deceased,
By Jennie C. Parker, Administratrix,
By Joshua R. H. Potts
Attorney.

Aug. 12, 1930.　　H. PARKER　　1,772,679
JOURNAL BOX BEARING
Filed March 2, 1927　　4 Sheets-Sheet 3
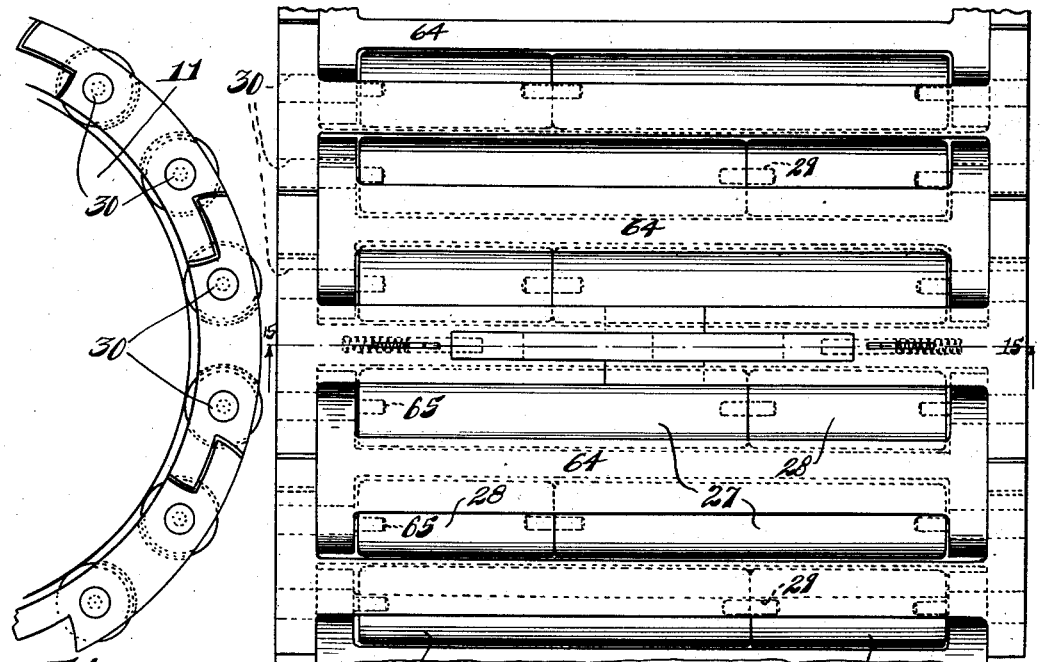
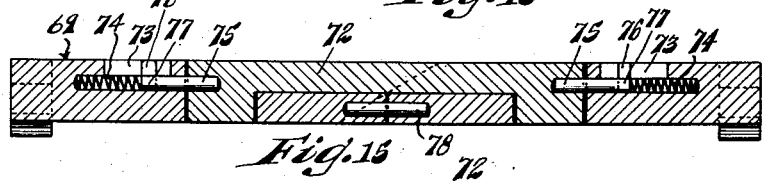
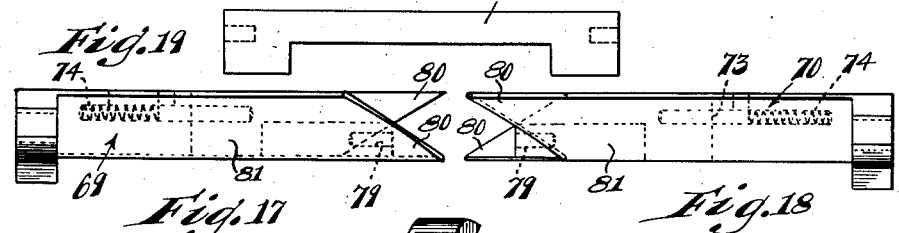
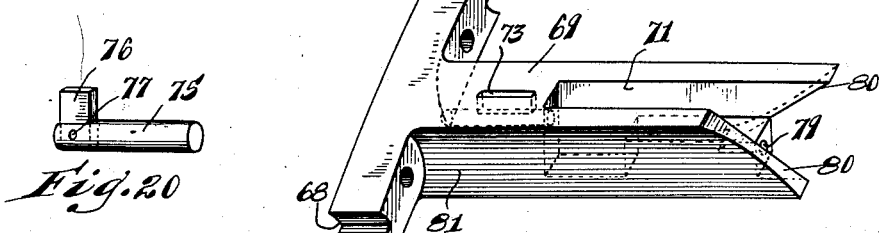
Inventor
Hubbard Parker, deceased,
By Jennie C. Parker Administratrix,
Attorney.

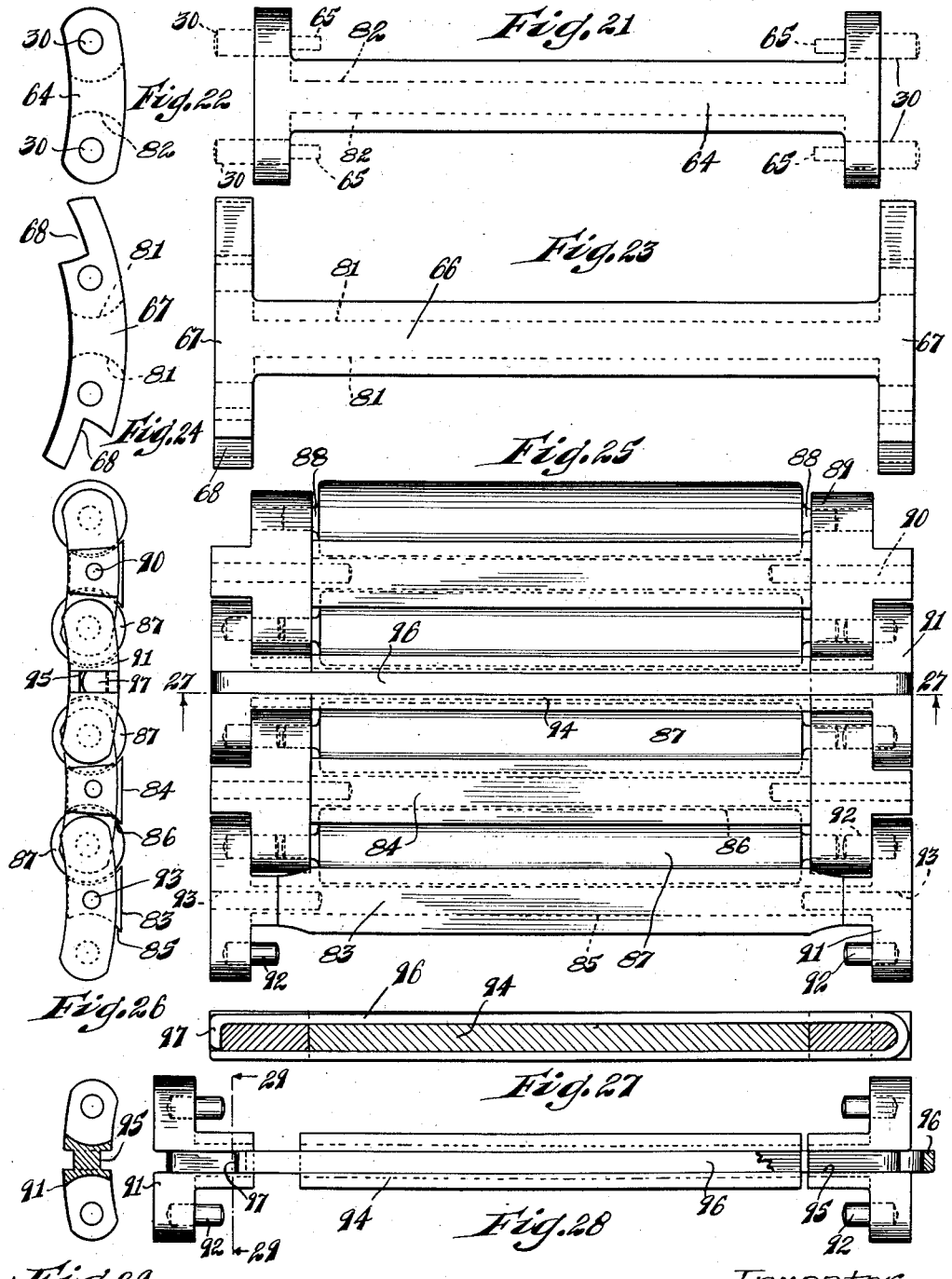

Patented Aug. 12, 1930

1,772,679

UNITED STATES PATENT OFFICE

HUBBARD PARKER, DECEASED, LATE OF CHICAGO, ILLINOIS, BY JENNIE C. PARKER, ADMINISTRATRIX, OF CHICAGO, ILLINOIS

JOURNAL-BOX BEARING

Application filed March 2, 1927. Serial No. 172,025.

This invention relates to bearings and more particularly to journal box bearings, and an object of the invention is to provide a bearing of the above indicated character, which is adapted to be used in the standard railway car journal boxes.

Another object of the invention is to provide a bearing of the above indicated character which allows great flexibility and provides ample strength and capable of carrying all radial end thrust and the resultant loads.

Another object is to provide a roller bearing chain having means for locking the ends of said chain together so as to form an endless chain adapted to be placed on the journal or taken off over the end of the journal without being unlocked, and said locking means adapted to be released whenever desired for removing the rollers without taking them off over the end of the journal.

Another object of the invention is the provision of a self-contained continuous bearing of elements adapted to be readily assembled and put into place without necessity of entire journal box disassembly and wherein the respective units may be easily replaced when required, while at the same time involving means whereby proper alignment of the bearing elements relative to the car journal will at all times be maintained.

The invention also involves efficient oil or lubricant distributing means for even and proper application of the lubricant to the moving portions within the journal-box; while at the same time providing for proper disposition of dust and metal particles away from the bearing surfaces of the moving portions; with the result that a substantially frictionless bearing is provided adapted to eliminate the "hot box" at present encountered, and which will therefore reduce the maintenance cost encountered with present day constructions.

The present invention is in particular an improvement over the prior Patent No. 1,572,121, issued February 9, 1926, as will be clearly brought out in the following description.

The invention will be best understood by reference to the accompanying drawings forming a part of this specification, and in which:

Figure 1 is a longitudinal sectional view of the journal box showing a journal position therein and having the invention applied thereto.

Figure 2 is a cross-sectional view taken on approximately the line 2—2 of Figure 1.

Figure 3 is a sectional view taken on approximately the line 3—3 of Figure 1.

Figure 4 is a side view of the hood and wedge comprising a part of the invention.

Figure 5 is an end view of that disclosed in Figure 4.

Figure 6 is a side view of the pan or guard for guarding and guiding the rollers.

Figure 7 is a plan view of a portion of the assembled roller chain.

Figure 8 is an end view of that disclosed in Figure 7.

Figure 9 is a plan view of a portion of the improved locking mechanism.

Figure 10 is an end view of that disclosed in Figure 9.

Figure 11 is a side view of another portion of the locking mechanism.

Figure 12 is a side view of the main locking pin.

Figure 13 is a plan view of a modified form of assembled roller chain.

Figure 14 is an end view of that disclosed in Figure 13.

Figure 15 is a longitudinal sectional view of a locking link and is taken on approximately the line 15—15 of Figure 13.

Figure 16 is a perspective view of one end of the locking link disclosed in Figure 15.

Figure 17 is a side view of one end of said locking link.

Figure 18 is a side view of the other end of said locking link.

Figure 19 is a side view of a rib member which is adapted to secure the ends of the locking link together.

Figure 20 is a perspective view of a spring-held pin for holding said rib member in position in the locking link.

Figure 21 is one of the links used for holding the rollers.

Figure 22 is an end view of that disclosed in Figure 21.

Figure 23 is the other link member which is normally pivotally connected to the link disclosed in Figure 21.

Figure 24 is an end view of that disclosed in Figure 23.

Figure 25 is a plan view of another modified form of roller bearing assembly.

Figure 26 is an end view of that disclosed in Figure 25.

Figure 27 is a longitudinal section taken on approximately the line 27—27 of Figure 25 and shows a modified form of locking link.

Figure 28 is a plan view of said locking link disclosed in Figure 27, being partly disassembled.

Figure 29 is a cross sectional view taken on approximately the line 29—29 of Figure 28.

In the drawings and for the purpose of illustration, there is shown a preferred embodiment of the invention, and in which is provided a journal box 10 of the standard construction with a journal 11 positioned therein. The bottom of the journal box is filled with a heavy oil 12 for lubricating the journal and all other working parts, and a felt oil retainer 13 is provided in the channel 14 to prevent oil leaking out of the box along the shaft 15.

The bearing face of the journal 11 is turned below the surface of the shaft 15 as shown in Figure 1, thereby providing a thrust shoulder 16 and a thrust flange 17 to prevent excessive endwise motion of the journal relative to the journal box 10.

Positioned above the journal is a hood 18 having thrust flanges 19 and 20 adapted to engage members 16 and 17, respectively, for taking the thrust of the axle shaft 15.

Hood 18 is loosely fitted above the journal 11 so as to allow sufficient endwise motion relative thereto, but when the journal movement is excessive the hood 18 is moved with it and is adapted to transfer the force of the end thrust to flange 21 of the wedge member 22, and moves said wedge member out against lug 23 of the box 10 which limits the allowable end thrust movement. If the thrust is in the other direction, the hood 18 will come in contact with portion 24 of the box 10 and limit the allowable thrust in that direction.

The wedge 22 is loosely fitted on the top of hood 18 and is adapted to move lengthwise relative thereto and is provided with a convex upper surface in contact with the upper wall 25 of the journal box; and is adapted to rock thereon to allow great flexibility between the journal and the journal box for smoothness of operation over rough roads.

Interposed between the hood 18 and the journal is the upper portion of an endless roller chain 26 composed of rollers 27 and 28 of different length and arranged end to end and aligned by means of a pin 29 extending into the inward ends of both rollers. The rollers 27 and 28 are preferably alternately disposed at opposite sides of the chain, as shown in Figure 7. The successive rollers in the chain are held in relative position by means of pin 30 pressed into the ends 31 of link members 32 which extend the whole width of the roller chain. The link bars or members 32 are formed on their longitudinal sides to receive the rollers; and in the specific exemplification this is accomplished by providing the top and bottom of each bar or member 32 with the plates 33 and 34 which extend partly over the edge of the rollers, and aid in keeping them in place, in case one of the pins 29 or 30 should break or come out of place. Pins 30 hold the rollers in place by extending into the ends of said rollers which are rotatable thereon; said pins 30 are tightly pressed in members 31 but are loosely arranged in the forked member 35 so that member 35 may oscillate thereon as it rotates around the journal while said journal is in motion.

Under the roller chain when mounted in position, as best shown in Figures 1 and 3, is provided a pan or guide member 36 which holds the roller chain in substantially the form of an ellipse with the lower side of the chain in spaced relation with the bottom of the journal. The pan 36 is provided with oil holes 37 and a base member 38, mounted in the upper portion of a coil spring 39, which contacts on the bottom of the journal box 10 and yieldingly holds the pan against the rollers which are below the journal.

On the front of the pan is provided an upwardly turned portion 40, and on the upper side of the pan is provided two integral ribs 41 and 42, which act as guides for the roller chain in conjunction with the thrust flanges 19 and 20. On the upper edges of said pan are provided inwardly formed ear members 43, having upwardly extending portions 44, which, together with said members 43, form angles into which the hood extensions 45 are positioned.

The pan 36 is also provided with outwardly bent portions 46 on the upper edge and upwardly extending members 47. The members 46 and 47 being at an angle to each other, forming a seat for the inwardly projecting portion 48 of the journal box 10.

On the sides of the hood are provided lug members 49 which loosely fit into grooves 50 in the upper end of the side members of journal box 10, as shown by the broken away portion of Figure 3.

Between the hood 18 and the wedge 22 are provided a plurality of pockets 51, which cause the members 18 and 22 to be lightened in weight without materially affecting their strength, and said pockets are adapted to receive bits of metal which may break off from said members.

In the front end of the hood 18 are provided oil passages 45' leading downwardly to the lower face of the hood through which oil may pass to the journal 11.

Extending from the guard pan 36 upwardly in front of the end of journal 11 is a cover plate 36' held in place between lugs 37' and lug 21, as shown in Figure 1.

The journal bearing surface, the rollers and the hood, are thoroughly casehardened to insure long life and practically frictionless operation. The rollers are so arranged of different lengths that great flexibility is allowed, the wearing of the various parts is more even, and the likelihood of breakage is greatly reduced. In operation the heavy oil is carried to the journal by the rotation of the bearing chain, and a cover plate 52 is provided on the front of the journal box 10, hinged at 53, for keeping dirt and dust out of the oil and all the working parts.

In Figures 7 to 12, inclusive, there is shown a novel locking means for a roller bearing chain, consisting of the end or head portions 54 of the link members 32, with certain modifications as follows:

In Figure 9 is shown a fragmentary view of a bar 32 with the head portion 54 thereon, but one of the fork members 35 has been removed, and the other member 35 has a slot 55 through the side of the pivot, or pin hole 56. In the place of the removed member 35 is provided a loose member 57, which hooks over the pin 58, which is secured to the head 54 in a suitable manner. A pin 59, having a flat head 60, is adapted to pass through the hole 61 in the member 57, and the head 60 fits into the groove 62 as shown in Figures 7 and 11. The pin 59 has a flattened portion 63, which passes through the slot 55 in member 35 and allows the successive links to be locked together, or unlocked by merely rotating the pin 59 sufficiently to cause the flat portion 63 to register with the slot 55, and then slipping the pin out through the slot along with the member 31, to which it is secured by a pin 63'.

In Figures 13 to 25 there is shown a modification of the invention consisting of the same type of rollers 27 and 28, and pins 29 and 30; the pins 30 are pressed into the link members 64 and have reduced end portions 65, adapted to loosely fit into the outer end of the rollers for holding them in place, for rotation on the journal 11. Other link members 66 are provided as shown in Figure 23 having wider end members 67, than those of the link members 64; said end members 67 having notches 68 therein which permit the end members 67 to interlock with each other, as shown in Figure 14, thereby retaining the bearing chain in a curved position, and at the same time allowing sufficient flexibility.

In Figure 16 is a perspective view of one end 69 of a locking link, showing the groove 71 into which a rib member 72 is adapted to fit, for holding the members 69 and 70 together as shown in Figure 13. In slots 73 are positioned springs 74 which yieldingly hold lock pin 75 in the end of said rib member 72. It is obvious that by forcing the pin 75 back upon the spring 74, by means of the upwardly extending lug 76, secured to pin 75 by a rivet 77, a rib member 72 may be removed and the ends 69 and 70 of the locking link may be separated.

The inner ends of members 69 and 70 are cut as in Figures 16, 17 and 18, so as to fit each other, and are held in alignment by a pin 78 entered into apertures 79 and by the complemental extensions 80 on said locking link members. It is obvious that link 66 pivots on pins 30 and the rollers 27 and 28 fit in between links 64 and 66, and into the grooves 81 and 82 in the sides of the links, as shown in Figures 16, 22 and 24.

In Figures 25 to 29 is shown another modification of the invention which consists of bars 83 and 84 having grooves 85 and 86, respectively, into which rollers 87 are adapted to be loosely fitted. Said rollers have trunnions 88 which fit into head members 89 for rotation therein. The head members are secured to bar 84 by pins 90, and to each other by other head members 91, provided with pins 92 which lock heads 90 and 91 together, but allow oscillation of head 90 on pin 92. Heads 91 are held onto bar 83 by suitable pins 93, and thereby make a complete flexible roller chain.

Figures 27 to 29 represent a special locking link, bar 94 being provided with the heads 91 which have slots 95 in them to accommodate a spring clamp 96, as shown in Figure 27. It is apparent that the spring clamp may be released by prying up the end 97 and sliding the heads off as shown in Figure 28, and thereby affording an easy method of making or separating the endless roller chain as desired, and as may be required for purposes of repairs.

While the invention has been described in its preferred form, it is apparent that many modifications may be made therein without departing from the spirit of the invention.

The invention, therefore, is not limited to the precise details set forth, but such variations and modifications as come within the scope of the appended claims may be employed.

What is claimed is:

1. In combination with a standard railway car journal, a railway car journal box, an endless roller bearing chain, comprising link members having heads on their extremities pivoted together; rollers disposed between said link members, and guard plates on said link members.

2. In combination with a railway car journal and a railway car journal box, an endless roller bearing chain having great flexibility, comprising a plurality of link members; pins for securing said link members together; a plurality of rollers of different length interposed between said link members and said pins, and mounted for rotation on said pins; and guard plates secured to said link members.

3. In combination with a railway car journal and journal box, an endless roller chain mounted loosely over said journal, and extending into an oil reservoir well below said journal; a pan positioned beneath said bearing chain for guiding said chain; and causing it to assume an elliptical shape; oil in said reservoir for oiling the bearing chain as it passes through the same; ribs on said pan to limit the endwise motion of said chain; spring means beneath said pan and ear members on the top edges of said pan for retaining said pan in position.

4. A locking means for a roller bearing chain, consisting of head members provided with projections on the front and rear thereof; a front projection of one head member having a pin secured therein and passing through a rear projection on another head member; said pin having a flattened portion thereon and said rear projection having a slot therein for receiving said flattened portion of said pin.

5. A locking means for a roller bearing chain, consisting of head members provided with projections on the front and rear thereof; a front projection of one head member having a pin secured therein and passing through a rear projection on another head member; said pin having a flattened portion thereon and said rear projection having a slot therein for receiving said flattened portion of said pin; a loosely arranged side member pivoted on and positioned adjacent the head end of said pin, said member having an aperture adapted to hook over a second pin member.

6. And endless roller bearing chain consisting of link members provided with head members; guard plates secured to said link member; each head member having projections on the front and rear thereof; a projection on the front of each head being adapted to engage a projection on the rear of the head forwardly thereof; pin means passing through said projections for pivotally securing each head with the preceding one, and rollers positioned between said link members.

7. An endless roller bearing chain consisting of link means provided with head members; guard plates secured to said link members; each of said head members having projections on the front and rear thereof; a projection on the front of each head member adapted to engage a projection on the rear of a head member forwardly thereof; pin means passing through said projections for pivotally securing each head member with a preceding one; a plurality of rollers of different length positioned between said link means, and pivotally mounted on the pins which pivotally secure said head members together.

8. An endless roller bearing chain consisting of link means provided with head members; guard plates secured to said link members; each of said head members having projections on the front and rear thereof; a projection on the front of each head member adapted to engage a projection on the rear of a head member forwardly thereof; pin means passing through said projections for pivotally securing each head member with a preceding one; a plurality of rollers of different length positioned between said link means, and pivotally mounted on the pins which pivotally secure said head members together; one of said link members being provided with locking means which is adapted to be released for removing said link for taking said endless chain apart.

9. In combination with a standard railway car journal and journal box, an endless roller bearing chain comprising elongated link members having integral head portions at their ends, the head portions of successive link members being pivotally connected together while the longitudinal sides of the members are formed to provide roller receiving recesses, and rollers disposed intermediate of the adjacent link members between the head portions thereof and pivotally connected to said head portions.

10. In combination with a railway car journal and journal box, an endless roller bearing chain adapted to extend about the journal, said chain being of greater circumference than the journal, so as to depend beneath the journal and merely contact with the upper surface of journal comprising link members constituting spacer bars extending throughout the width of the chain and provided with integral head portions at their ends, the head portions of the respective link members having lapping relation with each other and being pivotally connected together, and rollers disposed intermediate of the adjacent link members and between the head portions thereof.

11. In combination with a railway car journal and journal box provided with a lubricant holding well below the journal, an endless roller bearing defining a greater circumference than that of the journal so as to merely contact with the upper part of the journal while traveling about the journal during rotation of the latter, the lower part of the endless bearing being adapted to travel through the lubricant holding well, said bearing comprising elongated link members provided with head portions, the head portions of the successive link members arranged in lapping relation and pivotally connected together, a hood having a concaved lower bearing surface adapted to fit over the roller bearing above the journal, with its ends formed to constitute guides for the opposite sides of the bearing, a wedge block provided at one end with a depending flange extending throughout its width and adapted to lap the entire outer end of the hood, the top of the wedge block being made arcuate lengthwise and having tilting engagement with the top of the journal box, and means disposed beneath the journal for guiding the endless bearing and yieldingly maintaining it in spaced relation with the walls of the journal box.

12. In combination with a railway car journal and journal box, bearing mechanism for the journal comprising an endless roller chain of length greater than the circumference of the journal so as to extend over the journal and depend beneath the same into the lower part of the journal box, said chain consisting of a plurality of rollers disposed substantially throughout the length of the bearing surface of the journal and bars disposed lengthwise of the rollers and terminating in laterally disposed heads, with the head portions of the respective bars formed to lap the head portions of the adjacent bars, the lapping head portions being pivotally secured together, an arcuate pan positioned beneath the journal and formed to receive the depending lower portion of the chain to hold the latter above the bottom of the journal box, said pan having upstanding ribs adapted to lap the opposite sides of the chain so as to hold the latter against excessive movement lengthwise of the journal, the sides of the pan extending on opposite sides of the journal and provided at top with projections arranged at an angle to each other to provide a hood seat, a hood fitting over the chain on the upper side of the journal, said hood being seated at opposite sides on said seats at the top of the pan whereby proper relation between the pan and hood is maintained, and means whereby the pan is yieldingly supported above the bottom of the journal box.

13. In combination with a railway car journal and journal box, an endless roller chain for said journal of dimensions greater than the circumference of the journal so as to fit loosely over the journal and depend therebeneath into an oil reservoir in the bottom of the journal box, a pan yieldingly supported in the bottom of the journal box adapted to have the chain pass therethrough and hold the latter against movement lengthwise of the journal, and means at the upper edges of the pan for retaining the latter in proper position.

14. A journal box bearing comprising, in combination with a journal, an endless bearing adapted to loosely fit over the bearing surface of the journal and depend therebeneath into the bottom of the journal box which latter is provided with an oil reservoir in its bottom, the endless bearing consisting of rollers adapted to extend throughout the length of the journal bearing face, bars disposed transversely between the successive rollers and provided at the opposite ends with heads extending transversely and having portions occupying different circumferential planes to permit the head portions of the successive bars to lap each other, means for pivotally securing said head portions together, the rollers having their ends pivotally secured to the head portions, a slot and pin connection between the two end bars of the bearing, and locking means pivoted on one of said end bars for locking the pin in said slot.

15. In combination with a railway car journal and journal box, an endless roller chain of greater circumference than the journal, mounted loosely over the journal so as to depend therebeneath and extend into an oil reservoir in the lower part of the journal box; said chain comprising rollers extending substantially throughout the bearing surface of the journal, bars extending throughout the length of the rollers and terminating in laterally disposed heads beyond the outer ends of the rollers, with the longitudinal sides of the bars adapted to provide roller receiving sockets, the respective heads being adapted to lap each other and be pivotally secured together to constitute links; a perforated arcuate pan positioned beneath the bearing chain and adapted to support the depending portion of the chain, the perforations in the pan permitting oil from the reservoir to oil the bearing chain as it passes through the pan; the pan being provided with upwardly disposed ribs arranged adjacent to the outer sides of the links, acting as guides to limit endwise motion of the chain; and means for yieldingly holding the pan above the bottom of the journal box.

16. In combination with a railway car journal and journal box, an endless roller chain for said journal of dimensions greater than the circumference of the journal so as to fit loosely over the journal and depend therebeneath into an oil reservoir in the bottom of the journal box, a perforated concaved pan yieldingly supported in the oil reservoir in spaced relation with the bottom of the journal box and provided with upstanding guides for opposite sides of the roller chain, said pan having upstanding sides disposed on opposite sides of the journal and provided with seating portions, a hood adapted to fit over the roller chain above the journal and seated on said seating portions, the hood having lubricant introducing ports leading from the outer end down toward the chain engaging face and provided on its upper face with a plurality of pockets, and a wedge block intermediate of the hood and the top of the journal box, provided with an arcuate upper face and with a depending flange throughout the outer end thereof adapted to lap the outer end of the hood.

In testimony whereof, I, JENNIE C. PARKER, the administratrix of the Estate of Hubbard Parker, deceased, have signed my name to this specification.

JENNIE C. PARKER,
*Administratrix of the Estate of Hubbard Parker, Deceased.*